United States Patent
Kouchri et al.

(10) Patent No.: US 7,889,854 B2
(45) Date of Patent: Feb. 15, 2011

(54) SYSTEMS, DEVICES, AND METHODS FOR HANDLING CONNECTIVITY LOSS

(75) Inventors: Farrokh Mohammadzadeh Kouchri, Boca Raton, FL (US); Bizhan Karimi-Cherkandi, Boca Raton, FL (US)

(73) Assignee: Siemens Enterprise Communications GmbH & Co. KG

( * ) Notice: Subject to any disclaimer, the term of this patent is extended or adjusted under 35 U.S.C. 154(b) by 1373 days.

(21) Appl. No.: 11/285,433

(22) Filed: Nov. 22, 2005

(65) Prior Publication Data

US 2006/0109967 A1 May 25, 2006

Related U.S. Application Data

(60) Provisional application No. 60/630,750, filed on Nov. 24, 2004.

(51) Int. Cl.
*H04M 3/42* (2006.01)
(52) U.S. Cl. .............................. 379/211.01; 379/211.02
(58) Field of Classification Search ............ 379/211.02, 379/211.01; 455/445, 519
See application file for complete search history.

(56) References Cited

U.S. PATENT DOCUMENTS

| | | | |
|---|---|---|---|
| 5,566,236 A | 10/1996 | MeLampy | |
| 5,752,185 A | 5/1998 | Ahuja | |
| 5,995,830 A | 11/1999 | Amin | |
| 2002/0090947 A1 | 7/2002 | Brooks | |
| 2002/0090950 A1* | 7/2002 | Uskela | 455/445 |
| 2003/0134617 A1 | 7/2003 | Duerk | |
| 2004/0203424 A1 | 10/2004 | Akhteruzzaman | |
| 2004/0203607 A1 | 10/2004 | Satapathy | |
| 2004/0235509 A1 | 11/2004 | Burritt | |
| 2005/0048981 A1* | 3/2005 | Anupam et al. | 455/445 |
| 2007/0205867 A1* | 9/2007 | Kennedy et al. | 340/10.1 |

FOREIGN PATENT DOCUMENTS

WO   WO 2005013577   *   2/2005

* cited by examiner

*Primary Examiner*—Ahmad F Matar
*Assistant Examiner*—Oleg Asanbayev
(74) *Attorney, Agent, or Firm*—Laurence A. Greenberg; Werner H. Stemer; Ralph E. Locher (57) ABSTRACT

Certain exemplary embodiments comprise a method that can comprise, responsive to a request from a second telecommunications device for a first call between the second telecommunications device and a first telecommunications device, determining one or more signals adapted to cause a second call to be set-up between a virtual subscriber and the second telecommunications device. Certain exemplary embodiments can, via the one or more signals, cause the second call to be set-up between the virtual subscriber and the second telecommunications device.

21 Claims, 4 Drawing Sheets

SYSTEMS, DEVICES, AND METHODS FOR HANDLING CONNECTIVITY LOSS

CROSS-REFERENCES TO RELATED APPLICATIONS

This application claims priority to pending U.S. Provisional Patent Application Ser. No. 60/630,750, filed 24 Nov. 2004 the entire contents of which are incorporated herein in its entirety.

BACKGROUND

U.S. Pat. No. 6,937,713 (Kung), which is incorporated by reference herein in its entirety, allegedly recites a "method and system for providing call forwarding in an IP telephone network is disclosed. First, when a telephone number for a first telephone from a second telephone is dialed, the call is routing to a call manager. Call setup procedures with a BRG responsible for the first telephone are then initiated. The BRG then checks stored call forwarding profiles to determine whether there is an active call forwarding profile for the first telephone. The call is connected to the first telephone if an active call forwarding profile is not found. However, if an active call forwarding profile is found, the call forwarding information is sent to the call manager. The call is routed to at least a third telephone based on the call forwarding information." See Abstract.

U.S. Pat. No. 6,954,524 (Gibson), which is incorporated by reference herein in its entirety, allegedly recites a "call forwarding service is accessible through a common service management system using a graphical user interface (GUI) via the Internet and an interactive voice response system via the public switched telephone network. Using the GUI, the subscriber builds and edits service data, including a screening list and weekly schedule. The GUI displays a forward-to number field and multiple activation fields. The call forwarding service is activated in response to an ON indication of a first activation field, implementing call forwarding functionality to forward calls to the forward-to number; the screening list is activated in response to an ON indication of a second activation field, forwarding only calls from the listed telephone numbers to the forward-to number; and the weekly schedule is activated in response to an ON indication of a third activation field, enabling the call forwarding functionality only during the listed time periods." See Abstract.

United States Patent Application number 20040203424 (Akhteruzzaman), which is incorporated by reference herein in its entirety, allegedly recites a "method of preserving or gracefully concluding wireless calls that are dropped when service is interrupted in a wireless communication system (100) (e.g., due to poor RF coverage). When a mobile unit (108) encounters a service interruption during a call, an announcement (208) is played inviting remaining participating unit(s) to hold. After a predetermined waiting time (210, 216), if service is not re-established to the mobile unit, the remaining unit(s) are invited (218) to leave a message (e.g., voice mail) for the mobile unit and connected (220) to a messaging system (126). After message(s) are concluded, the call is ended (226) or optionally, continued (206) if there is more than one remaining unit. If service is recovered before the waiting time expires, a service recovery announcement is provided (214) to the remaining unit(s) and the call continues (206)." See Abstract.

U.S. Pat. No. 5,995,830 (Amin), which is incorporated by reference herein in its entirety, allegedly recites a "method and apparatus for processing dropped calls. If, during an established call between two communication devices, a telecommunication network node determines that a communication link to one of the devices has been dropped, the node determines the cause of the dropped communication link and sends a status message to the non-dropped communication device. If a reconnection attempt is appropriate, the node attempts to reconnect to the dropped device. If a reconnection attempt is not appropriate, or if the reconnection attempt is unsuccessful, the non-dropped communication device is connected to a voice mail node. If the reconnection attempt is successful, the call between the two communication devices is re-established." See Abstract.

SUMMARY

Certain exemplary embodiments comprise a method that can comprise, responsive to a request from a second telecommunications device for a first call between the second telecommunications device and a first telecommunications device, determining one or more signals adapted to cause a second call to be set-up between a virtual subscriber and the second telecommunications device. Certain exemplary embodiments can, via the one or more signals, cause the second call to be set-up between the virtual subscriber and the second telecommunications device.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

When the following terms are used substantively herein, the accompanying definitions apply:

a—at least one.

acknowledge—to transmit a message from a receiver of data to acknowledge that a signal, information, or packet has been received from a sender.

activity—an action, act, step, and/or process or portion thereof.

adapted to—capable of performing a particular function.

and/or—either in conjunction with or in alternative to.

server—an information device and/or a process running thereon that is communicatively coupled to a network and that is adapted to provide at least one service for at least one other device communicatively coupled to the network and/or for at least one process running on the other device.

associated—related to.

automatically—acting or operating in a manner essentially independent of external influence or control. For example, an automatic light switch can turn on upon "seeing" a person in its view, without the person manually operating the light switch.

call—an attempted telephonic communication.

can—is capable of, in at least some embodiments.

cause—to precipitate a result.

comprising—including but not limited to.

connect—physically or logically link two or more entities.

data—distinct pieces of information, usually formatted in a special or predetermined way and/or organized to express concepts.

detect—sense or perceive.

determine—ascertain, obtain, and/or calculate.

execute—to carry out instructions.

Gateway Control Protocol (Megaco H.248)—a signaling protocol, used between a Media Gateway and a Media Gateway Controller (also known as a Call Agent or a Soft Switch) in a VoIP network. This protocol is defined by International Telecommunication Union (ITU) ITU-T Recommendation H.248.

H.323 Protocol—a standard approved by the International Telecommunication Union (ITU) that defines how audiovisual conferencing data is transmitted across networks. This protocol is defined by ITU-T Recommendation H.323.

indicate—to signify.

information—processed, stored, and/or transmitted data.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initiate—begin.

instructions—directions adapted to perform a particular operation or function.

Internet Protocol (IP)—a network protocol that specifies the format of packets, also called datagrams, and the addressing scheme for the packets. By itself, IP is a protocol for providing a message from a source to a network, but does not establish a direct link between the source and the destination. TCP/IP, on the other hand, can establish a connection between two communicators so that they can send messages back and forth for a period of time. IP is defined by a plurality of standards and/or documents referenced by RFC 774 and RFC 766.

unregistration—a cessation of a communicative coupling between a device and a registration entity.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

notification—information transmitted to advise an entity of an event, status, or condition.

btain—to procure and/or receive.

operation—a state of executing a predetermined plurality of machine-readable instructions.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be a dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish and/or supply.

provisioned profile—information indicative of desires and/or subscribed services associated with a telecommunications entity.

proxy—an entity acting as a substitute for a separate and distinct entity.

receive—accept something provided and/or given.

register—(v) to identify a telecommunications device as communicatively coupled to a network.

registration—a status of a telecommunications device as being communicatively coupled to a network.

registration monitor—a device or system adapted to track a registration status of a telecommunications device.

registration status change notification—information adapted to advise a first telecommunications entity regarding a registration status of a second telecommunications entity.

registration server—a device or system adapted to provide registration information.

request—a message asking for something.

request registration notification—a signal and/or command adapted to request a registration status for a telecommunications device.

responsive—reacting to an influence and/or impetus.

sending—to convey.

Session Announcement Protocol (SAP)—an Internet Engineering Task Force (IETF) protocol for distributing session description messages to potential recipients.

Session Description Protocol (SDP)—a protocol defined in Request For Comment (RFC) 2327 and adapted to describe multimedia sessions for the purpose of session announcement, session invitation, and other forms of multimedia session initiation.

Session Initiation Protocol—a telecommunications signaling protocol for an IP network defined in Request For Comment (RFC) 3261.

set-up—initiated via at least one machine readable instruction.

signal—detectable transmitted energy that can be used to carry information. Operationally, a type of message, the text of which consists of one or more letters, words, characters, symbols, signal flags, visual displays, or special sounds, with prearranged meaning and which is conveyed or transmitted by visual, acoustical, or electrical means. The information in a signal can be, for example digitally encrypted via for example, public key, PGP, and/or triple-DES, etc. As another example, the signal can be broadcast via, for example, a spread-spectrum technology such as, for example a frequency hopping or a direct-sequence spread-spectrum system.

Simple Gateway Control Protocol (SGCP)—a protocol defined in Request For Comment (RFC) 2705, and adapted for use to control telephony gateways from external call control elements.

substantially—to a great extent or degree.

system—a collection of mechanisms, devices, data, and/or instructions, the collection designed to perform one or more specific functions.

telecommunications device—a product adaptable to communicate over a distance. For example, a telephone, fax machine, telex, networked information device, and/or cellular telephone, etc.

transmit—to convey (force or energy) from one part of a mechanism to another.

unregister notification—a signal and/or command adapted to indicate that a telecommunications device and/or virtual subscriber is not registered with a registration server.

via—by way of and/or utilizing.

virtual subscriber—a device and/or process comprising a plurality of machine-readable instructions adapted to simulate a telecommunications device.

voicemail service—a device or system comprising hardware and/or software adapted to record a message provided by a user of a telecommunications device.

Voice over Internet Protocol (VoIP)—a technology, ability, way, protocol, and/or defined and structured set of commands adapted to use an IP network as a transmission medium for voice information. VoIP is adapted to send voice data in packets using IP rather than by traditional circuit transmissions of a public switched telephone network.

wireless—any data communication technique that utilizes electromagnetic waves emitted by an antenna to communicate data (i.e., via an unguided medium), including such data communication techniques as sonar, radio, cellular, cellular radio, digital cellular radio, ELF, LF, MF, HF, VHF, UHF, SHF, EHF, radar, microwave, satellite microwave, laser, infrared, etc., and specifically excluding human voice radio transmissions, the data communication technique having a carrier frequency ranging from about 1 Hz to about $2 \times 10^{14}$ Hz (about 200 teraHertz), including all values therebetween, such as for example, about 40 Hz, 6.010 kHz, 8.7 MHz, 4.518 GHz, 30 GHz, etc. and including all subranges therebetween, such as for example, from about 100 kHz to about 100 MHz, about 30 MHz to about 1 GHz, about 3 kHz to about 300 GHz, etc. Wireless communications can include analog and/or digital data, signals, and/or transmissions.

DETAILED DESCRIPTION

Certain exemplary embodiments comprise a method that can comprise, responsive to a request from a second telecommunications device for a first call between the second telecommunications device and a first telecommunications device, determining one or more signals adapted to cause a second call to be set-up between a virtual subscriber and the second telecommunications device. Certain exemplary embodiments can, via the one or more signals, cause the second call to be set-up between the virtual subscriber and the second telecommunications device.

Certain exemplary embodiments can provide a method for a user to receive telecommunications network features after losing connectivity with a telecommunications network. Connectivity can be lost via an unplugged telephone, cut line, loss of power, defective telephone, defective switch, defective gateway, defective router, telephone out-of-range, substantial interference, poor signal/noise ratio, dropped hand-off, and/or dropped connection between telephone and cordless and/or wireless base station, etc. Certain exemplary embodiments provide telecommunications network features to a user of an IP phone such as an IP phone utilizing a Voice over IP (VoIP) protocol.

Figure 1:
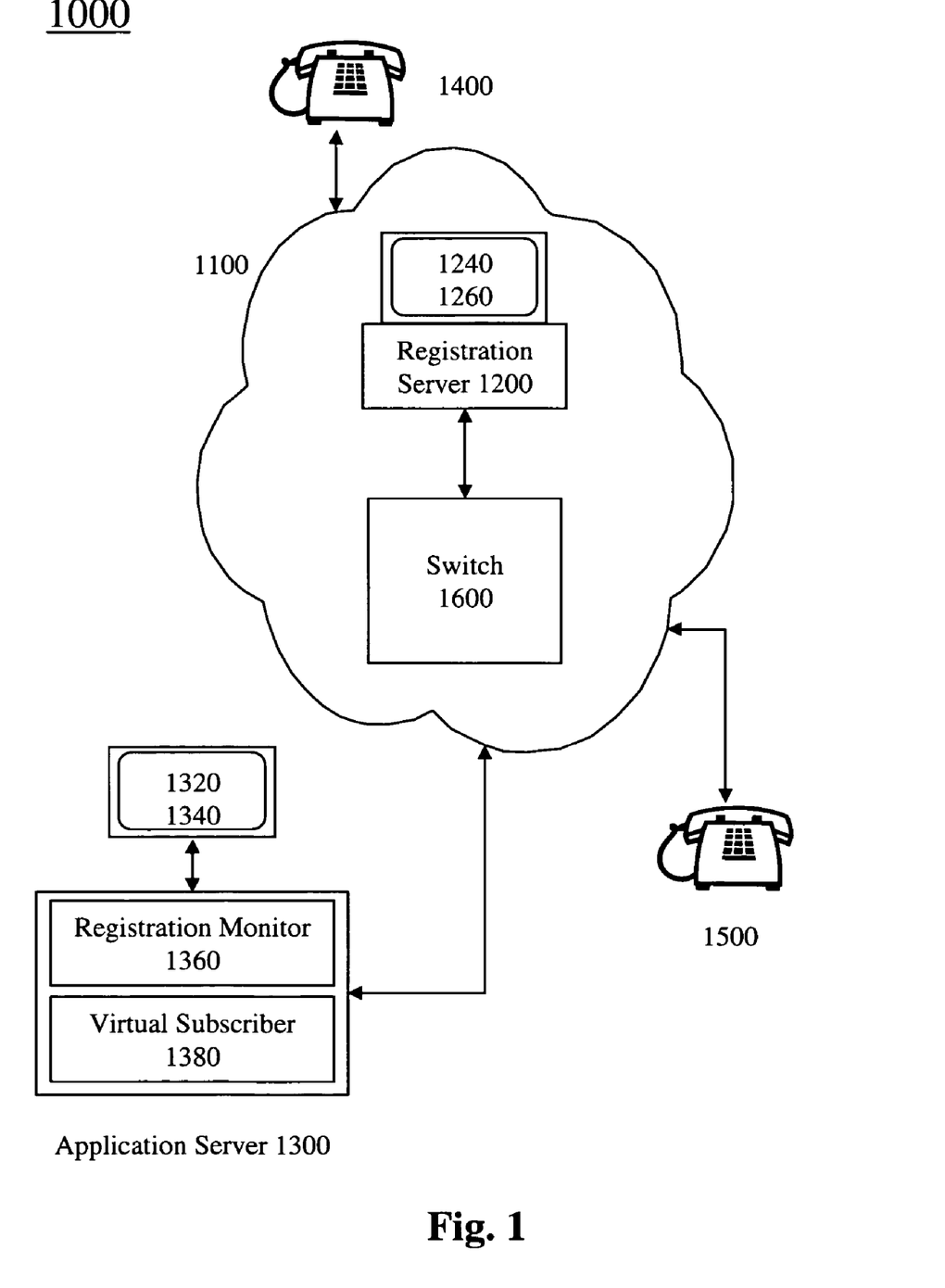
FIG. 1 is a side view of an exemplary embodiment of a system 1000.

FIG. 1 is a side view of an exemplary embodiment of a system 1000, which can comprise a network 1100. Network 1100 can be and/or utilize any of a wide variety of networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone network, and/or one or more Internet service providers, and/or one or more information devices, such as a switch, router, and/or gateway not directly connected to a local area network, etc.

Within and communicatively coupled to network 1100 can be a switch 1600 and/or a registration server 1200. Outside and communicatively coupled to network 1100 can be telecommunication devices 1400, 1500, and/or an application server 1300. Network 1100 can be adapted to communicatively couple registration server 1200 and application server 1300. In certain exemplary embodiments, registration server 1200 and application server 1300 can comprise software, firmware, and/or hardware associated with a single and/or multiple information devices. Registration server 1200 can comprise a user program 1260 adapted to register and/or unregister telecommunications devices such as telecommunications devices 1400, 1500. Registration server 1200 and/or application server 1300 can be communicatively coupled to switch 1600. Switch 1600 can be adapted to create a circuit and/or virtual circuit connection between telecommunications devices 1400, 1500.

Switch 1600 can provide information regarding connectivity and/or status of telecommunications devices 1400, 1500 with one or more devices communicatively coupled via network 1100. For example, in certain exemplary embodiments, responsive to a first predetermined signal and/or command from registration server 1200, application server 1300, telecommunications device 1400, and/or telecommunications device 1500, switch 1600 can be adapted to provide a signal, reply, and/or information to registration server 1200, application server 1300, telecommunication device 1400, and/or telecommunication device 1500 regarding a registration status and/or a registration status change associated with telecommunications device 1400 and/or 1500. In certain exemplary embodiments, switch 1600 can provide this function in a system not comprising registration server 1200 and/or application server 1300. In certain embodiments, switch 1600 can be adapted to communicate, responsive to the first predetermined signal and/or command, information regarding a status and/or status change associated with telecommunications devices 1400, 1500 (e.g., connectivity status, registration status, busy status, current caller and callee information, current call duration, and/or recent call history, etc.) can be provided via a notification and/or message, such as an e-mail, fax, letter, page, telephone call (e.g., via a recorded voice message), voicemail, instant message, and/or web site posting, etc., to an IP device and/or non-IP device, etc. In certain exemplary embodiments, registration server 1200, application server 1300, telecommunications device 1400, and/or telecommunications device 1500 can request, via a second predetermined signal and/or command, for switch 1600 to cease providing registration status and/or registration status change information regarding telecommunications device 1400 and/or 1500. Switch 1600 can be adapted to provide a signal acknowledging receipt of the second predetermined signal and/or command and/or regarding cessation of providing registration status and/or registration status change information regarding telecommunications device 1400 and/or 1500.

Registration server 1200 can be adapted to accept a registration request and/or notification of a registration request, such as from telecommunications devices 1400, 1500 and/or switch 1600. Responsive to the request, user program 1260 can be adapted to place information regarding telecommunications devices 1400, 1500 in a registration database. Registration server 1200 can be adapted to communicate registration status information with application server 1300. Registration server 1200 can comprise a user interface 1240, which can be adapted to render information regarding registration of telecommunications devices 1400, 1500.

To detect a connectivity loss affecting at least one of telecommunications devices 1400, 1500, user program 1260 can be adapted to request, on a periodic, aperiodic, deterministic, and/or random basis, a response from telecommunications devices 1400, 1500. If one or more of telecommunications devices 1400, 1500 fail to respond, user program 1260 can be adapted to unregister an unresponsive device and/or system.

Application server 1300 can comprise a user interface 1320, which can be adapted to render information regarding registered and/or unregistered telecommunications devices such as any of telecommunications devices 1400, 1500. Application server 1300 can comprise a user program 1340, which can be adapted to provide a registration monitor 1360 and/or a virtual subscriber 1380. In certain exemplary embodiments, registration monitor 1360 and/or virtual subscriber 1380 can be associated with separate information devices. Registration monitor 1360 can be adapted to request registration information and/or information regarding registration status changes from registration server 1200. Registration monitor 1360 can be adapted to receive an indication from registration server 1200 regarding a registration status change from either "registered" to "unregistered" or from "unregistered" to "registered" regarding one or more of telecommunications devices 1400, 1500, and/or can determine such a change in status.

Responsive to a status change to "unregistered," user program 1340 can trigger and/or initiate operation of virtual subscriber 1380. For example, if information device 1400 lost connectivity with registration server 1200 over network 1100, registration server 1200 can provide a message to registration monitor 1360 and/or registration monitor 1360 can recognize that connectivity loss based on a recognized change in a registration status information provided by registration server 1200. User program 1340 can be adapted to trigger and/or initiate operation of virtual subscriber 1380 responsive to receiving information regarding unregistration of telecommunications device 1400. Virtual subscriber 1380 can be adapted to request a registration of itself with registration server 1200. Upon registering with registration server 1200, virtual subscriber 1380 can be associated with a telecommunications address of telecommunications device 1400.

Should telecommunications device 1500 desire a communicative connection with telecommunications device 1400, a user of telecommunications device 1500 can dial and/or cause to be dialed a telecommunications address of telecommunications device 1400. Responsive to a determination that telecommunications device 1400 is unregistered, and therefore not communicatively couplable to telecommunications device 1500, application server 1300 can be adapted to provide a communicative coupling between telecommunications device 1500 and virtual subscriber 1380. Virtual subscriber 1380 can be adapted to perform a variety of functions comprising features such as call forwarding, voicemail, paging, fax generation, e-mail generation, instant message generation, and/or providing a user specified message regarding a loss of connectivity of telecommunications device 1400, etc.

In certain exemplary embodiments, connectivity of telecommunications device 1400 to registration server 1200 can be restored. Responsive to restored connectivity, telecommunications device 1400 can be adapted to request re-registration with registration server 1200. Responsive to the re-registration of telecommunications device 1400, application server 1300 can be adapted to stop and/or suspend virtual subscriber 1380. Thereafter, application server 1300 can be adapted to unregister virtual subscriber 1380 with registration server 1200.

Figure 2:
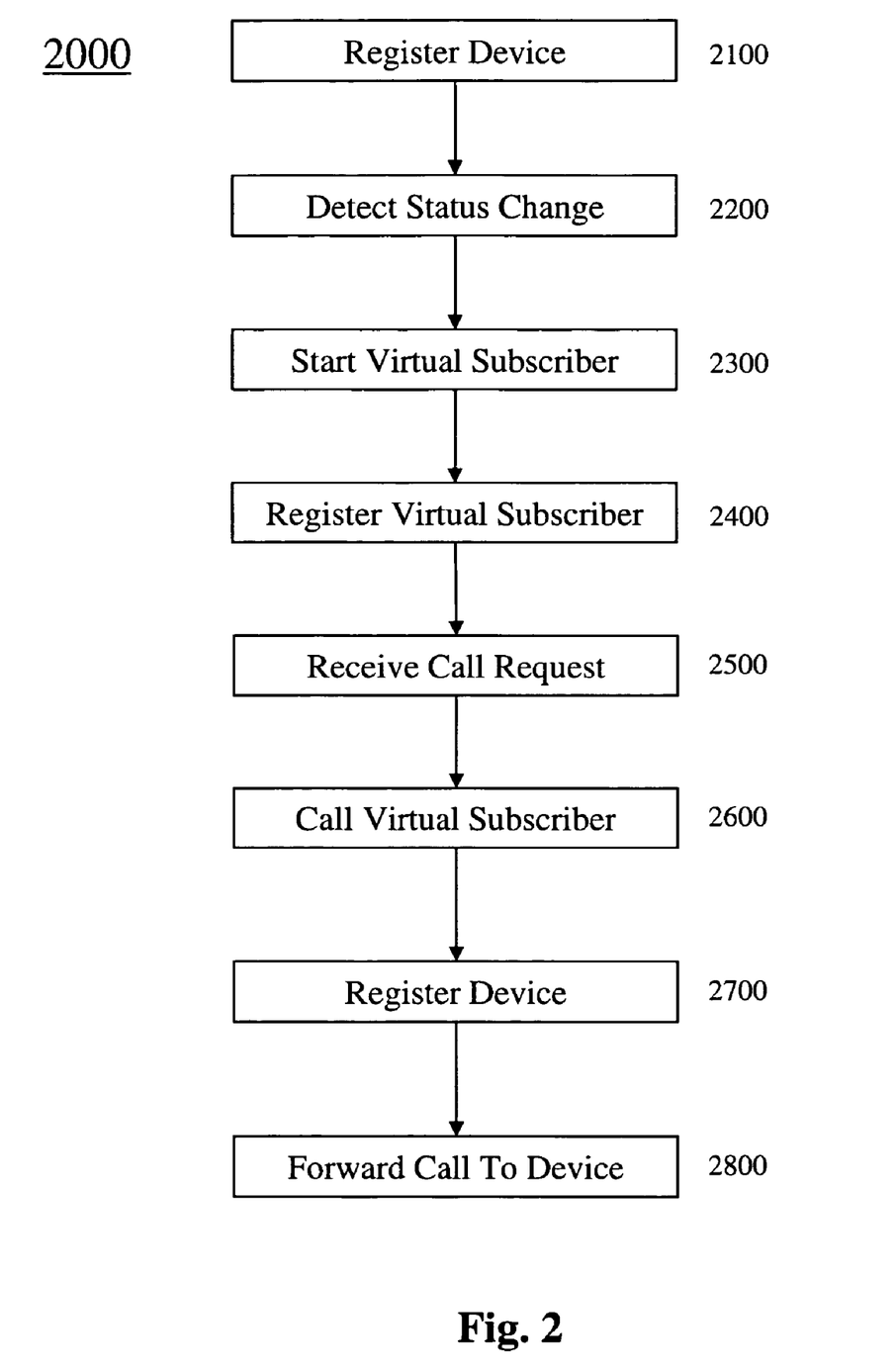
FIG. 2 is a flowchart of an exemplary embodiment of a method 2000.

FIG. 2 is a flowchart of an exemplary embodiment of a method 2000. At activity 2100, a first telecommunications device can be registered. Responsive to a change in the registration status due to registration of the first telecommunications device, a registration status change notification can be requested and/or transmitted. The first telecommunications device can be adapted to utilize Voice over Internet Protocol via an Internet Protocol network. The Voice over Internet Protocol can be a Session Initiation Protocol, H.323 Protocol, Gateway Control Protocol, Session Announcement Protocol, Session Description Protocol, Simple Gateway Control Protocol, Media Gateway Control Protocol, Remote Voice Protocol Over IP Specification, and/or Skinny, etc.

At activity 2200, a change can be detected in a registration status of the first telecommunications device. For example, the first telecommunications device can be unregistered responsive to a failure regarding a communicative coupling between the telecommunications device and a registration server. Responsive to the failure, the registration server can be adapted to change a status of the first telecommunications device and/or unregister the first telecommunications device.

At activity 2300, a virtual subscriber can be started responsive to a registration status change notification indicating an unregistration of the first telecommunications device.

At activity 2400, the virtual subscriber can be registered with the registration server. The virtual subscriber can be registered as a proxy for the first telecommunications device. Responsive to the registration of the virtual subscriber, a signal can be sent from the registration server to the registration monitor associated with the application server.

At activity 2500, a call request can be received. The call request can be made by a second communications device for a first call with the first telecommunications device. The application server can be adapted to determine one or more instructions adapted to cause a second call to be set-up between the virtual subscriber and the second telecommunications device responsive to the call request. The one or more instructions can be communicated to an information device and/or the virtual subscriber via the one or more signals.

At activity 2600, a second call can be connected to the virtual subscriber. The second call can be connected responsive to the one or more signals associated with the application server. In certain exemplary embodiments, responsive to a request of a user associated with the first telecommunications device, the second call can be forwarded to a third telecommunications device. The request from the user can be adapted to create and/or cause execution of an instruction associated with a provisioned profile associated with the user and/or the first telecommunications device. In certain exemplary embodiments, responsive to the second call, an instruction from a provisioned profile can be executed that can be adapted to connect the second telecommunications device to a voice-mail service. In certain exemplary embodiments, a fee can be charged responsive to, via the one or more signals, a connection of the second call between the virtual subscriber and the second telecommunications device.

At activity 2700, the first telecommunications device can request re-registration with the registration server responsive to a restored communicative coupling between the first telecommunications device and the registration server. In certain exemplary embodiments, the request for re-registration by the first telecommunications device can be subsequent to the registration of the virtual subscriber. For example if the first telecommunications device was unregistered due to a power outage and/or other loss of connectivity, the connectivity might be restored while the virtual subscriber is registered on behalf of the first telecommunications device. In such case the first telecommunications device can attempt to re-register, which can cause a notification to be sent so that the virtual subscriber can be unregistered, potentially after the virtual subscriber has completed forwarding of a call.

At activity 2800, the virtual subscriber can be adapted to be unregistered with the registration server and/or stopped by the application server responsive to the re-registration of the first telecommunications device.

Figure 3:
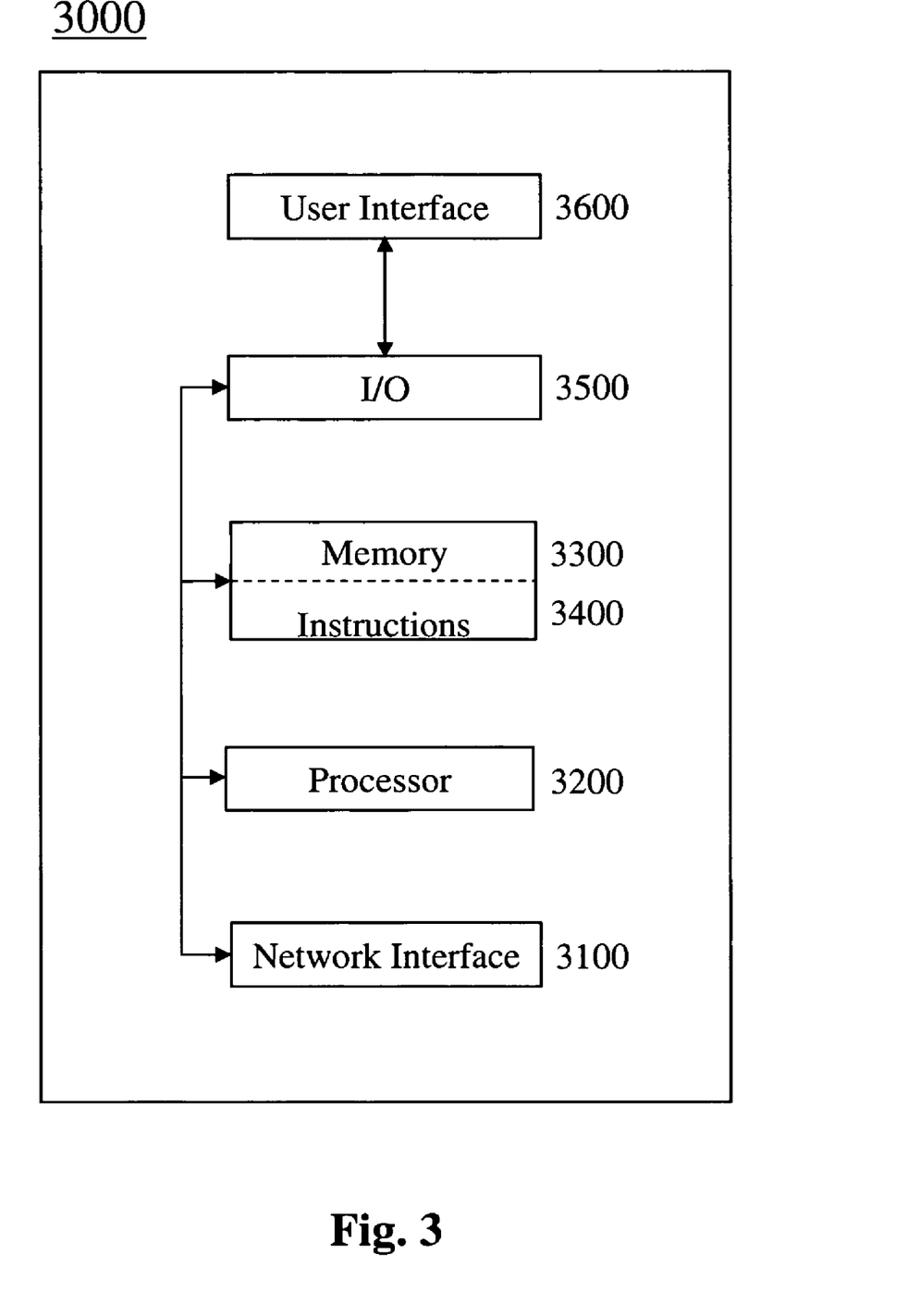
FIG. 3 is a block diagram of an exemplary embodiment of an information device 3000.

FIG. 3 is a block diagram of an exemplary embodiment of an information device 3000, which in certain operative embodiments can comprise, for example, registration server 1200 and/or application server 1300, of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a rendering of information related to managing telecommunications services responsive to a loss of connectivity of a telecommunications device.

Figure 4:
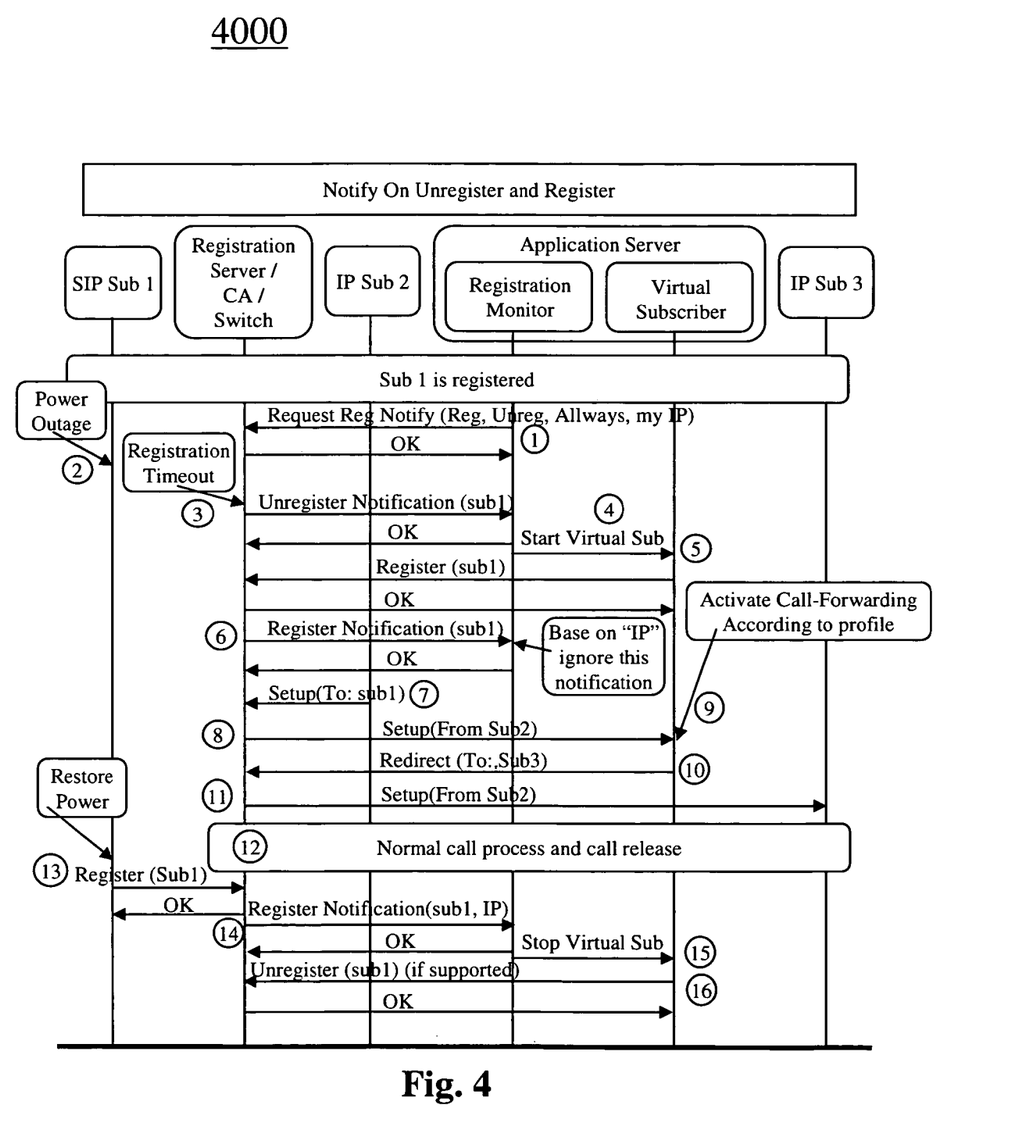
FIG. 4 is a diagram of a sequence of activities 4000.

FIG. 4 is a diagram of a sequence of activities 4000. At activity 1, an application server can request a notification of a status change of a first subscriber with a registration server. The notification request can be via a signal requesting notification of a status change. At activity 2, a loss of connectivity can be detected, such as because of a loss of connectivity due to a power outage affecting a communicative coupling between the first telecommunications device and the registration server.

At activity 3, a timeout in an information exchange between the registration server and the first telecommunications device can occur. Responsive to the timeout, the first telecommunications device can be unregistered with the registration server. Responsive to an unregistration of the first telecommunications device, a notification of the unregistration can be sent from the registration server to a registration monitor. The registration monitor can execute on an application server.

At activity 4, the registration monitor can trigger and/or begin execution of a virtual subscriber. The virtual subscriber can be executed on the application server. At activity 5, if the first telecommunications device has a subscription for specific call handling in event of a loss of connectivity, the virtual subscriber can register with the registration server as a proxy for the first telecommunications device. At activity 6, the registration of the virtual subscriber can result in a signal, indicative of a registration status change of the virtual subscriber, being sent from the registration server to the registration monitor. In certain exemplary embodiments, the registration monitor can ignore the signal and/or command indicative of registration status change of the virtual subscriber. In embodiments where the virtual subscriber is executed on the application server, the application server can already be aware of an operational or registration status of the virtual subscriber.

At activity 7, a second telecommunications device, desiring a communicative coupling with the first telecommunications device, can initiate a call. At activity 8, the call can be connected between the second telecommunications device and the virtual subscriber, which can be adapted to act as a proxy for the first telecommunications device.

At activity 9, the virtual subscriber can forward the call to a predetermined third telecommunications device. The third telecommunications device can be associated with a user of the first telecommunications device. At activity 10, the virtual subscriber can send a signal adapted to reroute the call to the predetermined third telecommunications device.

At activity 11, the call can be forwarded to the predetermined third telecommunications device responsive to the request from the virtual subscriber. At activity 12, normal call processing can occur between the second telecommunications device and the third telecommunications device during the second call.

At activity 13, the first telecommunications device can attempt to re-register with the registration sever, such as after connectivity is restored to the first telecommunications device. At activity 14, responsive to a request from the registration monitor, the registration server can send a notification of a registration status change of the first telecommunications device to the registration monitor.

At activity 15, the application server can be adapted to request an unregistration and/or a cessation of execution of the virtual subscriber responsive to the registration status change notification regarding the first telecommunications device. At activity 16, the virtual subscriber can be unregistered with the registration server.

In certain exemplary embodiments, a signaling protocol and/or standard, such as a selected Voice Over Internet Protocol, and/or a compiler and/or interpreter therefore, can be enhanced to include, recognize, and/or provide a signal and/or command, along with any appropriate arguments, variables, and/or variable values, that is the equivalent of "provide registration status information", "registration status request acknowledged", "stop providing registration status change information", "registration status is registered", and/or "registration status change has occurred", etc.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising a plurality of activities comprising:

communicatively coupling a registration server comprising a first user program to register and/or unregister a first and a second telecommunications device and an application server, the application server comprising a second user program and a virtual subscriber, the second user program initiating operation of the virtual subscriber;

operation of the virtual subscriber responsive to a registration status change notification requested responsive to a registration of the first telecommunications device and indicating unregistration of the first telecommunications device, the registration being a logon procedure and the unregistration being a log off procedure, the first telecommunications device utilizing Voice over Internet Protocol via an Internet Protocol network;

responsive to a request from the second telecommunications device for a first call between the second telecommunications device and the first telecommunications device, the application server determining one or more signals communicated to the virtual subscriber for causing a second call to be set-up between the virtual subscriber and the second telecommunications device;

via the one or more signals, causing the second call to be set-up between the virtual subscriber and the second telecommunications device;

subsequent to a registration of the virtual subscriber with the registration server as a proxy for the first telecommunications device, the registration server receiving notification of a registration request from the first telecommunications device; and responsive to registration of the first telecommunications device, transferring the second call to the first telecommunications device.

2. The method of claim 1, further comprising: detecting that the first telecommunications device is not registered with a registration server.

3. The method of claim 1, further comprising: registering the virtual subscriber as a proxy for the first telecommunications device.

4. The method of claim 1, further comprising: receiving a registration notification signal with a registration server, the registration notification signal associated with the virtual subscriber.

5. The method of claim 1, further comprising: forwarding the second call to a third telecommunications device responsive to an instruction from a provisioned profile associated with the first telecommunications device.

6. The method of claim 1, further comprising: subsequent to a registration of the virtual subscriber, receiving notification of a registration request from the first telecommunications device.

7. The method of claim 1, further comprising: upon registering with the registration server, the virtual subscriber being associated with a telecommunications address of the first telecommunications device.

8. The method of claim 1, further comprising: subsequent to a registration of the virtual subscriber, receiving notification of a registration request from the first telecommunications device; and responsive to registration of the first telecommunications device, commanding the virtual subscriber to stop operation.

9. The method of claim 1, further comprising: subsequent to a registration of the virtual subscriber, receiving notification of a registration request from the first telecommunications device; and responsive to registration of the first telecommunications device, unregistering the virtual subscriber.

10. The method of claim 1, further comprising: responsive to the second call, executing an instruction from a provisioned profile connecting the second telecommunications device to a voicemail service.

11. The method of claim 1, further comprising: responsive to the second call, executing an instruction from a provisioned profile connecting the second telecommunications device to a third telecommunications device.

12. The method of claim 1, wherein the Voice over Internet Protocol is a Session Initiation Protocol.

13. The method of claim 1, wherein the Voice over Internet Protocol is a H.323 Protocol.

14. The method of claim 1, wherein the Voice over Internet Protocol is a Gateway Control Protocol.

15. The method of claim 1, wherein the Voice over Internet Protocol is a Session Announcement Protocol.

16. The method of claim 1, wherein the Voice over Internet Protocol is a Session Description Protocol.

17. The method of claim 1, wherein the Voice over Internet Protocol is a Simple Gateway Control Protocol.

18. The method of claim 1, wherein the status change notification was caused by a power failure.

19. A system comprising:
an application server communicatively coupled to a registration server comprising a first user program to register and/or unregister a first and a second telecommunications device, the application server comprising;
a registration monitor;
a second user program; and
a virtual subscriber, the second user program initiating operation of the virtual subscriber triggered by the registration monitor responsive to a detected unregistration between the first telecommunications device and the registration server, the application server operating to, responsive to registration of the first telecommunications device with the registration server, transmit a first registration status change notification from the registration server to the registration monitor, the registration being a logon procedure and the unregistration being a log off procedure, the first telecommunications device utilizing Voice over Internet Protocol (VoIP) via an Internet Protocol network, the virtual subscriber connected to the second telecommunications device responsive to a request by the second telecommunications device for a call to the first telecommunications device;
the virtual subscriber registered with the registration server as a proxy for the first telecommunications device, the registration server receiving notification of a registration request from the first telecommunications device; and
responsive to registration of the first telecommunications device, transferring the call to the first telecommunications device.

20. A memory device comprising instructions for activities comprising:
communicatively coupling a registration server comprising a first user program to register and/or unregister a first and a second telecommunications device and an application server, the application server comprising a second user program and a virtual subscriber, the second user program initiating operation of the virtual subscriber;
operation of the virtual subscriber responsive to a registration status change notification requested responsive to a registration of a first telecommunications device and indicating unregistration of the first telecommunications device, the registration being a logon procedure and the unregistration being a log off procedure, the first telecommunications device utilizing Voice over Internet Protocol via an Internet Protocol network;
responsive to a request from the second telecommunications device for a first call between the second telecommunications device and the first telecommunications device, the application server determining one or more signals to the virtual subscriber causing a second call to be set-up between the virtual subscriber and the second telecommunications device;
via the one or more signals, causing the second call to be set-up between the virtual subscriber and the second telecommunications device;
subsequent to a registration of the virtual subscriber with the registration server as a proxy for the first telecommunications device, the registration server receiving notification of a registration request from the first telecommunications device; and responsive to registration of the first telecommunications device, transferring the second call to the first telecommunications device.

21. A method comprising a plurality of activities comprising: communicatively coupling a registration server comprising a first user program to register and/or unregister a first and a second telecommunications device and an application server, the application server comprising a second user program and a virtual subscriber, the second user program initiating operation of the virtual subscriber;
operation of the virtual subscriber responsive to a registration status change notification requested responsive to a registration of a first telecommunications device and indicating unregistration of the first telecommunications device, the registration being a logon procedure and the unregistration being a log off procedure, the first telecommunications device utilizing Voice over Internet Protocol via an Internet Protocol network;
responsive to a request from the second telecommunications device for a first call between the second telecommunications device and the first telecommunications device, the application server determining one or more signals to the virtual subscriber causing a second call to be set-up between the virtual subscriber and the second telecommunications device, charging a fee responsive to, via the one or more signals, a connection of the second call between the virtual subscriber and the second telecommunications device;
subsequent to a registration of the virtual subscriber with the registration server as a proxy for the first telecommunications device, the registration server receiving notification of a registration request from the first telecommunications device; and
responsive to registration of the first telecommunications device, transferring the second call to the first telecommunications device.

* * * * *